(12) United States Patent
Laude

(10) Patent No.: US 6,263,134 B1
(45) Date of Patent: Jul. 17, 2001

(54) COMPACT MULTIPLEXER

(75) Inventor: Jean-Pierre Laude, Saint Cyr la Riviere Par Saclas (FR)

(73) Assignee: Highwave Optical Technologies, Lannion (FR)

( * ) Notice: Subject to any disclaimer, the term of this patent is extended or adjusted under 35 U.S.C. 154(b) by 0 days.

(21) Appl. No.: 09/317,899

(22) Filed: May 25, 1999

(30) Foreign Application Priority Data

Jun. 4, 1998 (FR) .................................................. 98 07046

(51) Int. Cl.[7] .............................. G02B 6/293; G02B 6/34
(52) U.S. Cl. ................................ 385/37; 385/24; 359/130
(58) Field of Search .................................. 385/17, 18, 24, 385/37; 359/115, 117, 124–128, 130, 131

(56) References Cited

U.S. PATENT DOCUMENTS

| | | | |
|---|---|---|---|
| 4,387,955 | * 6/1983 | Ludman et al. | 385/37 |
| 4,559,500 | 12/1985 | McDermid et al. | |
| 5,206,920 | * 4/1993 | Cremer et al. | 385/37 |
| 5,278,687 | 1/1994 | Jannson et al. | |
| 5,457,573 | * 10/1995 | Iida et al. | 359/569 |
| 5,546,219 | * 8/1996 | Iida | 359/281 |
| 5,748,815 | * 5/1998 | Hamel et al. | 385/37 |
| 5,917,625 | * 6/1999 | Ogusu et al. | 359/130 |
| 5,966,483 | * 10/1999 | Chowdhury | 385/37 |
| 6,011,884 | * 1/2000 | Dueck et al. | 385/24 |
| 6,084,695 | * 7/2000 | Martin et al. | 359/131 |
| 6,097,859 | * 8/2000 | Solgaard et al. | 385/17 |

FOREIGN PATENT DOCUMENTS 0 196 963  10/1986 (EP).

OTHER PUBLICATIONS

Patent Abstracts of Japan, vol. 011, No. 374, Dec. 5, 1987 & JP 62-142426, (Matsushita Electric Ind. Co., Ltd.), Jun. 25, 1987.

* cited by examiner

Primary Examiner—John D. Lee
Assistant Examiner—Michelle R. Connelly-Cushwa
(74) Attorney, Agent, or Firm—Arent Fox Kintner Plotkin & Kahn, PLC

(57) ABSTRACT

Optical fiber wavelength multiplexer/demultiplexer having an optical axis and including a refraction grating having a dispersion plane; at least one exit fiber having an entrance face; at least one entrance fiber having an exit face; an optical combining device for optically combining the exit face of the entrance fiber with the entrance face of the exit fiber ensuring the operation of the grating in a Littrow configuration. The optical combining device includes a separate reflecting device for ensuring a fold-back of the optical axis thereby allowing a high Littrow angle.

18 Claims, 1 Drawing Sheet

COMPACT MULTIPLEXER

The present invention relates to a fiber-optic wavelength multiplexer-demultiplexer or router which can be used as a component in fiber-optic communications applications.

Such multiplexer-demultiplexers are already known and have been described, then progressively developed, in particular in French patents FR-2,543,768, FR-2,519,148, FR-2,479,981, FR-2,496,260 and in European patent EP-0, 196,963 which are marketed under the brand name "STI-MAX".

The latter document more particularly concerns a multiplexer-demultiplexer in which the entrance fibers and exit fibers are positioned in the immediate vicinity of the focus of a concave mirror. In this way, the divergent light flux received by the entrance fibers is transformed by the concave mirror into parallel light beams which are addressed on a planar diffraction grating, which in return directs the parallel beams to the concave mirror which focuses them on the ends of exit fibers. The grating thus operates according to the Littrow configuration.

In such a device, the following relationship is established to an approximate degree:

$$2a \sin \beta = k\lambda/n$$

where $a$ is the pitch of the grating, $\beta$ is the Littrow angle, i.e. the angle formed by the light beam (incident and refracted) with respect to the normal of the grating plane, $k$ is the order of refraction, $\lambda$ the wavelength and $n$ the refractive index of the medium in contact with the grating.

As is known, the angular dispersion $d\beta/d\lambda$ in the region of the Littrow conditions is all the greater as $\beta$ is high.

The spectral dispersion $dx/d\lambda$ is equal to $f(d\beta/d\lambda)$, where $f$ is the focal distance of the reflecting system and $x$ is the direction of dispersion in its focal plane. A high angular dispersion $d\beta/d\lambda$ thus allows to reduce the focal distance $f$ for a constant spectral dispersion $dx/d\lambda$.

For a given lateral distance between the fibers, the wavelength separation of the different channels is also conserved for a reduced focal plane $f$.

However, it is observed that increasing the Littrow angle calls for the grating to be inclined and makes it difficult to position the ends of the optical fibers.

The term fiber-optic multiplexer-demultiplexer is understood here to encompass devices in which the incoming and exiting light waves are propagated by optical fibers.

The invention also concerns fiber-optic routers in which a variable number of incoming optical signals each having a particular wavelength and propagated by spatially distinct optical fibers are addressed on exit optical fibers which may be different in number.

To simplify the description, the inventive device shall be termed multiplexer-demultiplexer, it being clearly understood that it can be a multiplexer, a demultiplexer or a router.

Known devices are globally satisfactory and have made it possible to construct multiplexed links bringing together a large number of paths with low crosstalk.

However, as these devices are being used more extensively, efforts are made to increase their performance and in particular to reduce the spectral gap between two paths (two consecutive wavelengths), while at the same time maintaining devices with reduced dimensions, i.e. with a limited focal length.

The object of the invention is thus to propose a compact multiplexer-demultiplexer with equivalent or improved properties in comparison with those of prior art devices and limited crosstalk.

To this end, the invention concerns a fiber-optic wavelength multiplexer-demultiplexer having an optical axis and comprising a diffraction grating having a dispersion plane, at least one entrance fiber having an exit face; at least one exit fiber having an entrance face, means for optically combining the exit face of the entrance fiber with the input face of the exit fiber ensuring the operation of the grating in a Littrow configuration.

According to the invention, the optical combining means comprise reflecting means allowing a high Littrow angle and ensuring a fold-back of the optical axis.

The combining means are preferably conjugating means.

In the different embodiments each featuring their respective advantages and susceptible of being associated according to many technically feasible combinations:

the optical combining means have an entrance and exit axis in the vicinity of which are located the exit face of the entrance fiber and the entrance face of the exit fiber and the reflecting means are formed by a mirror placed on said axis comprising a central opening allowing the passage of luminous flux directed on that axis;

the mirror is located at the level of the exit face of the entrance fiber;

the dispersive system is a planar diffraction grating, whose plane is parallel to the entrance and exit axis of the optical combining means;

the multiplexer-demultiplexer is composed of a set of associated optical elements, the diffraction grating being fixed on a lateral face of an element having an axis parallel to entrance and exit axis of the optical combining means;

the optical elements are adhered, and preferably glued;

the diffraction grating is fixed on said elements by resilient mounts;

the multiplexer-demultiplexer is composed of a set of associated optical elements and the diffraction grating is formed directly on one of the lateral faces of one of these optical elements;

the diffraction grating is carried on a support which can be expanded such as to cause the pitch of the grating to vary;

the support for the grating is dielectric.

The invention shall be described in more detail with reference to the drawings in which FIG. 1 shows a multiplexer-demultiplexer according to the prior art.

The figures depict the optical components of the device according to the invention, independently of the mechanical structures which support them and ensure their respective positioning. Such mechanical structures can take numerous forms and are within the reach of the skilled person.

The present description refers to the use of optical fibers as entrance and exiting means for the multiplexer-demultiplexer. It is however well known that there exist emitting components (diodes, linear or area arrays of diodes) and receiving components (CCDs—charge-coupled devices—linear or area array CCDs) whose active elements are of small dimensions, of the same order of size as the fiber cores, from a few microns to a few tens of microns, and regularly distributed, whose characteristics make them compatible with fibers. In some applications, such components can replace fibers at the entrance or exit of the multiplexer-demultiplexer of the invention and be positioned in place of the ends of the fibers, directly at the spectral focus. Such components are thus equivalent to fibers in the definition of the invention.

The following description makes reference to a multiplexer-demultiplexer. It is equally possible to implement the invention to form a router.

Figure 1:
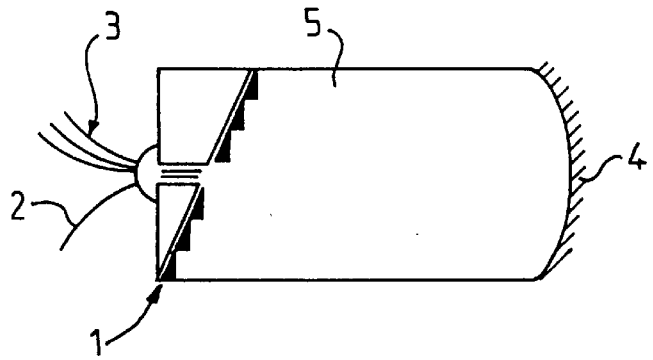

The multiplexer-demultiplexer shown in FIG. 1 comprises a dispersive system formed by a grating 1, an entrance fiber 2 which supplies the device with a multiplexed luminous flux and a bundle of exit fibers 3 which provides the differentiated fluxes for each of the wavelengths. The ends of these fibers 3, whose number is variable, are placed at the centre of grating 1, which is itself approximately at the focus of a reflecting optical system 4. The space 5 located between the grating 1 and the mirror 4 can receive various optical components for improving the properties of the system according to requirements. The grating can be holographic or etched.

Figure 2:
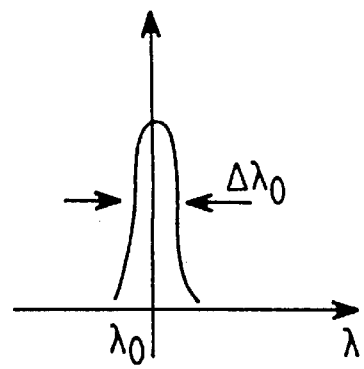
FIG. 2 is the elementary transfer function for a pair of entrance-exit fibers of the device shown in FIG. 1.

For such a system, the elementary transfer function defining the wavelength bandwidth for an entrance fiber-exit fiber pair, corresponding to a wavelength $\lambda_0$, has the form shown in FIG. 2. It is centred on the wavelength $\lambda_0$ and its half-maximum width is $\Delta\lambda_0$. This half-maximum width depends on the overall geometrical and optical characteristics of the device.

Crosstalk is the effect produced by a risk of overlap of the transfer functions respectively associated to two wavelengths $\lambda_1$ and $\lambda_2$ close to each other.

Figure 3:
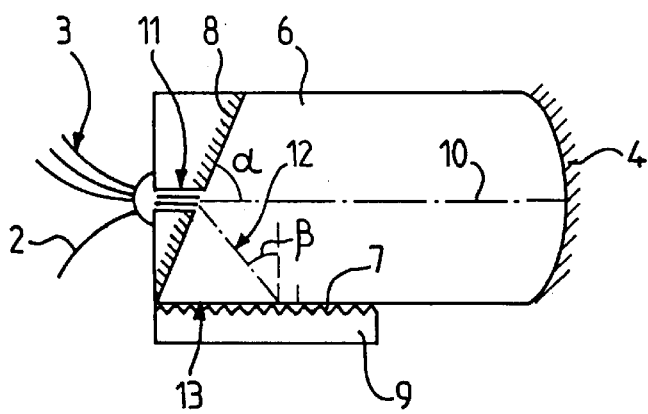
FIG. 3 shows a multiplexer-demultiplexer according to the invention.

The multiplexer-demultiplexer according to the invention is shown more particularly in FIG. 3. The entrance fiber 2 and the exit fibers 3 have their ends placed at the focus of a spherical mirror 4. Accordingly, the luminous flux emitted by the entrance fiber 2 is transformed by the mirror 4 into a parallel flux which is reflected by the mirror 8 inclined at an angle α with respect to the light flux entrance-exit axis 10. This parallel beam is thus reflected by the mirror 8 as a parallel secondary beam having an axis 12. The diffraction grating 7 mounted on a grating support 9 is applied against one of the plane lateral faces 13 of the multiplexer, the normal to the plane of the grating being comprised in the plane formed by the entrance-exit axis 10 and the normal to the mirror 8. The secondary beam 12 forms an angle β with the normal to the grating (Littrow angle).

α and β are connected by the relation α=(β+90)/2.

The mirror 8 is pierced with a central opening 11 so as to ensure correct operation of the device and the transmission of luminous flux from the entrance fiber 2 on the one hand and to the exit fibers 3 on the other. This central opening of small dimensions thus allows luminous flux to be transmitted from or to the fibers without significantly affecting the reflection of the parallel beam reflected by the spherical mirror 4.

The luminous flux incident on the grating 7 is diffracted, reflected in return by the mirror 8 and also focused in return by the spherical mirror 4 to the exit fibers 3, as a function of the luminous flux wavelength.

It can thus be understood that by folding back the parallel light beam it is possible to choose a relatively large angle β while keeping an equally large value for α, the angle subtended by the axis of the ends of the fibers with the mirror. This has for result that at the same time as the high value for β allows for an increase in the angular dispersion, the high value for α facilitates the positioning of the ends of the fibers 2, 3 at the focus of the spherical mirror 4.

To give an example, good results have been achieved with silica components, a spherical mirror of radius R≈96 mm, a 20 mm×20 mm square section for the block 6, a grating 7 having a pitch corresponding to 300 lines per mm, an angle α≈65° and therefore an angle β≈40°. The length D is of the order of 50 mm. This system functions in the fourth order of the grating.

The body 6 of the multiplexer-demultiplexer can be constructed so as to provide thermal correction. In particular, the implementation of an element 6 made from LF5 silica allows an excellent stability to be achieved between –20° C. and +60° C.

However, such means are not absolutely necessary and, for some less critical applications, e.g. when thermal stabilisation is ensured by external means, it is possible to use a multiplexer-demultiplexer made of pure silica or another transparent optical material.

In accordance with the invention, the grating 7 is thus positioned on a plane lateral face of the multiplexer. It can brought against the latter after having been moulded on a support 9. The support 9 is then glued to the face 13 of the multiplexer-demultiplexer or affixed by resilient mounts preferably at three points.

It is also possible to form the grating directly on the face 13 of the support 9; the grating is then formed thereon by classical methods using a die imprinting its pattern on a resin previously deposited on the support or lateral face 13. The grating formed in this way—with the usual precautions for unmoulding under satisfactory conditions—is then covered with a reflecting treatment and thereafter protected by a varnish.

It is also possible to construct a temperature stabilised multiplexer-demultiplexer from silica known under the designation LF5 with the following values of parameters: radius of spherical mirror 4≈109 mm, angle α≈63° and thus β≈38°, length D≈55 mm. The other parameters have the same values as in the previous example.

In order to produce a multiplexer-demultiplexer which features both the required properties and good temperature stability, an optical doublet such as proposed in French patent FR-97,07128 may be used.

Figure 4:
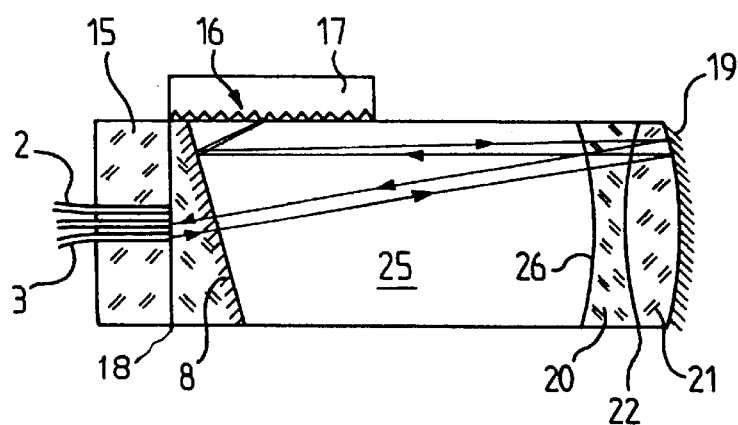
FIG. 4 shows a multiplexer-demultiplexer according to the invention which is temperature stabilised.

Thus, for instance, the multiplexer-demultiplexer shown in FIG. 4 comprises a fiber-holder 15 fixing the entrance fiber 2 and the exit fibers 3.

A dispersive element 16, in this case a grating, is carried by a grating carrier 17. The fiber-holder 15 and the mirror 18 are in contact via an interface 18.

The mirror 19 reflects the rays it receives; it is unitary with a doublet formed of two elements 20 and 21 joined by an interface 22.

The incoming light flux produced by the entrance optical fiber 2, after refraction by the diopter interface 18, and on the central zone 13 of the diffracting element 16 and, after refraction by the doublet 20, 21, is reflected by the mirror 19 to the diffracting element 16. It is diffracted by this diffracting element 16, with a diffraction which is dependent on the wavelength of the flux considered.

The diffracted fluxes are again reflected by the mirror 19 and coupled to the exit fibers 3 as a function of their wavelength.

The indices and radii of curvature of the doublet 20, 21 are determined such that the latter corrects the geometric and chromatic aberrations of the assembly.

The space 25 between the diffracting element 16 and the first diopter 26 of the reflecting doublet is filled with air, or a gas, or is under a vacuum.

The properties of the reflecting achromatic doublet are preferably as follows:

The first element 21 carrying the reflecting mirror 19 is made from a glass known under the reference BaF52, its center thickness is 7.66 mm, the radius of curvature of its face carrying the mirror is 401.56 mm and the curvature of its second face is 748.90 mm.

The second element 20 of this doublet is made from a glass known under the reference PSK3, the curvature of its second face is 217.77 mm, and the distance between the interface 22 and the reflecting mirror is 271.6 mm. The material of the element 17 that carries the grating is silica. The distance from the face 26 to the end of the filter carrier is 21.49 mm.

In this embodiment of FIG. 4, the average distance between the interfaces 22 and 18 is 22 mm and the distance between the interface 22 and the reflecting mirror is 271.1 mm.

The two sub-assemblies—the one carrying the grating and the one carrying the reflecting doublet—are assembled by means of a square cross-section tube made of silica or other material having a small expansion coefficient, on which faces 16 and 26 come into pressing contact.

What is claimed is:

1. Optical fiber wavelength multiplexer/demultiplexer having an optical axis and comprising a diffraction grating having a dispersion plane; at least one exit fiber having an entrance face; at least one entrance fiber having an exit face; optical combining means for optically combining the exit face of the entrance fiber with the entrance face of the exit fiber ensuring the operation of the grating in a Littrow configuration, wherein said optical combining means comprise a separate reflecting means for ensuring a fold-back of the optical axis thereby allowing a high Littrow angle.

2. Optical fiber wavelength multiplexer-demultiplexer according to claim 1, characterised in that the optical combining means have an entrance or exit axis in the vicinity of which are located the exit face of the entrance fiber and the entrance face of the exit fiber and the reflecting means are formed by a mirror placed on said axis comprising a central opening allowing the passage of luminous flux directed on that axis.

3. Optical fiber wavelength multiplexer-demultiplexer according to claim 2, characterised in that the mirror is located at the level of the exit face of the entrance fiber.

4. Optical fiber wavelength multiplexer-demultiplexer according to any one of claims 2 and 3, characterised in that the diffraction grating is a planar diffraction grating, whose plane is parallel to the entrance and exit axis of the optical combining means.

5. Optical fiber wavelength multiplexer-demultiplexer according to claim 4, characterised in that the multiplexer-demultiplexer is composed of a set of associated optical elements, the diffraction grating being fixed on a lateral face of an element having an axis parallel to entrance and exit axis of the optical combining means.

6. Optical fiber wavelength multiplexer-demultiplexer according to claim 5, characterised in that the optical elements are glued.

7. Optical fiber wavelength multiplexer-demultiplexer according to claim 5, characterised in that the diffraction grating is fixed on said elements by resilient mounts.

8. Optical fiber wavelength multiplexer-demultiplexer according to claim 4, characterised in that the multiplexer-demultiplexer is composed of a set of associated optical elements and in that the diffraction grating is formed directly on one of the lateral faces of one of said optical elements.

9. Optical fiber wavelength multiplexer-demultiplexer according to claim 4, characterised in that the diffraction grating is carried on a support which can be expanded such as to cause the pitch of the grating to vary.

10. Optical fiber wavelength multiplexer-demultiplexer according to claim 9, characterised in that the support for the grating is dielectric.

11. Optical fiber wavelength multiplexer-demultiplexer according to claim 5, characterized in that the diffraction grating is carried on a support which can be expanded such as to cause the pitch of the grating to vary.

12. Optical fiber wavelength multiplexer-demultiplexer according to claim 11, characterized in that the support for the grating is dielectric.

13. Optical fiber wavelength multiplexer-demultiplexer according to claim 6, characterized in that the diffraction grating is carried on a support which can be expanded such as to cause the pitch of the grating to vary.

14. Optical fiber wavelength multiplexer-demultiplexer according to claim 13, characterized in that the support for the grating is dielectric.

15. Optical fiber wavelength multiplexer-demultiplexer according to claim 7, characterized in that the diffraction grating is carried on a support which can be expanded such as to cause the pitch of the grating to vary.

16. Optical fiber wavelength multiplexer-demultiplexer according to claim 15, characterized in that the support for the grating is dielectric.

17. Optical fiber wavelength multiplexer-demultiplexer according to claim 8, characterized in that the diffraction grating is carried on a support which can be expanded such as to cause the pitch of the grating to vary.

18. Optical fiber wavelength multiplexer-demultiplexer according to claim 17, characterized in that the support for the grating is dielectric.

* * * * *